United States Patent [19]

Albinger

[11] 4,233,105

[45] Nov. 11, 1980

[54] LABELLING DEVICES FOR TAPE CASSETTES INCLUDING AN ADHESIVE APPLYING DEVICE, LABEL APPLYING DEVICE, A PRESSURE DEVICE, AND A TURN OVER ROLL

[76] Inventor: Rolf Albinger, Alte Landstrasse 40, 6314 Unterägeri, Switzerland

[21] Appl. No.: 72,211

[22] Filed: Sep. 4, 1979

[51] Int. Cl.[3] .................... B32B 31/00; B65C 9/00; B65C 11/04

[52] U.S. Cl. .................... 156/559; 156/566; 156/578

[58] Field of Search .................... 156/559, 566, 578

[56] References Cited

U.S. PATENT DOCUMENTS 1,873,967 8/1932 Klute .................... 156/559
4,009,070 2/1977 Linmans .................... 156/559

*Primary Examiner*—Douglas J. Drummond

[57] ABSTRACT

A labelling apparatus for tape cassettes is described in which the cassettes are pushed stepwise out of a magazine on to a guide track and advanced along a guide track by one cassette width at a time. A carrier is disposed above the track and carries at least one set of treatment devices, comprising a device for applying an adhesive or adhesive aid, a label applying device and a pressure stamp. In the intervals between two successive feed steps the carrier together with the devices is lowered and in this manner, as the cassette is advanced, the cassette successively has adhesive, a label and pressure applied thereto. Preferably the carrier carries two sets of treatment devices with a turn-over roll for the cassettes disposed between the sets so that the cassettes can be provided on both sides with a label during a single pass through the apparatus.

18 Claims, 4 Drawing Figures

LABELLING DEVICES FOR TAPE CASSETTES INCLUDING AN ADHESIVE APPLYING DEVICE, LABEL APPLYING DEVICE, A PRESSURE DEVICE, AND A TURN OVER ROLL

BACKGROUND OF THE INVENTION

1. Field of the Invention

The present invention relates to a labelling device, especially for recording tape cassettes, comprising a magazine for the cassettes to be labelled, a feed device which pushes the cassettes one after another out of the magazine and stepwise into a guide track, and comprising, disposed along the guide track one after another in the feed direction of the cassettes, at least one device for applying an adhesive or adhesive aid onto one surface of the cassette, at least one label box and at least one pressure stamp.

2. Description of the Prior Art

Recording tape cassettes possess, on each of their two faces, a raised region at which the drive device and the sound film head or heads of the recording or play-back device engage the tape, and also a recessed area onto which a label is applied. Instructions by the manufacturer and/or information to be recorded on the tape are usually printed on the label, or the labels are provided for writing on by the user. In order permanently to fix the labels onto the cassette, either a suitable adhesive is applied onto the rear face of the label or the recessed area is treated with a solvent, which makes the plastic material of the cassette sticky.

Various devices are already known, by which labels can be applied onto recording tape cassettes.

A first known apparatus possesses a rectilinear transportation track, on which the cassettes are transported continuously through the device standing upright on one of their narrow edges. At the inlet end of the transportation track a horizontal cassette magazine is disposed together with an automatic feed apparatus which pushes the cassetes from the magazine onto the track. On each side of the transport track a labelling drum is disposed, which cooperates with an associated, likewise horizontal label box. Both the labelling drums take the labels from the associated label boxes, guide them if necessary past a wetting roller and transfer the labels simultaneously onto a cassette passing between the drums. The cassettes are then guided through between a plurality of pressing rollers disposed in pairs on either side of the transport track. The labelled cassettes are then removed from the outlet end of the transport track.

This apparatus requires a complicated electronic control in order to provide assurance that each label brought forward by the labelling drum is transferred accurately into the recessed area of the cassette continuously passing by.

Another known apparatus possesses a vertical cassette magazine from which there is supplied a transport track on which the cassettes lie and are transported stepwise through the apparatus. Laterally alongside the transport track and after one another in the transporting direction, two label boxes are disposed with labels lying one upon another. In the region of each label box a stamp is provided which can be moved pneumatically up and down and also swung transversely to the transport track. The stamp plate of this stamp is provided with openings connected to a suction line. A turn-over device for the cassettes is disposed along the transport track between the two label boxes with the associated stamps. In this apparatus, each stamp is swung over the associated label box and is then lowered on to the stack of labels and a label is sucked on to the stamp. The stamp together with the label is then raised, swung over the transport track and, during an interruption between two steps of the cassette transportation, is lowered onto a cassette. After pressing the labels on to the cassette, the suction is interrupted and the stamp raised.

It will be understood that this apparatus requires a complicated control device which synchronizes the mechanical movements and the pneumatic installation in order that the labels can be taken from the label boxes and applied onto the appropriate area of the cassette.

It is an object of the present invention to provide an apparatus, which is constructed considerably more simply and therefore is more reliable in operation than the known apparatuses, wherein all the necessary movement sequences are synchronized mechanically with one another and in which, with a high throughput rate, a hitherto not achievable accuracy of the positioning of the labels is possible.

BRIEF SUMMARY OF THE INVENTION

According to the present invention there is provided a labelling apparatus for tape cassettes comprising a magazine for the cassettes, a feed path for the cassettes, means for successively feeding the cassettes from said magazine to said feed path and for advancing said cassettes stepwise along said feed path, a carrier disposed above said feed path, an adhesive applying device mounted on said carrier, a label applying device mounted on said carrier, a pressure applying device mounted on said carrier, said adhesive applying device, label applying device and pressure applying device being mounted on said carrier in succession in the direction of advance of said cassettes along said feed path, carrier raising and lowering means associated with said cassette feeding means operable to hold said carrier in a raised position relative to said feed path during the advance of said cassettes and to lower said carrier towards said feed path when said cassettes are stationary on said feed path whereby in the lowered position of said carrier said adhesive applying device applies adhesive to a first cassette on the feed path, said label applying device applies a label to the applied adhesive on a second cassette on the feed path and said pressure applying device applies pressure to the applied label on a third cassette on the feed path.

The invention further provides a labelling apparatus for applying labels to tape cassettes comprising a magazine for storing tape cassettes in stacked relationship, a guide track defining a feed path extending in proximity to the lowermost cassette in the stack, feed means operable at intervals successively to engage the lowermost cassette in the stack and advance the engaged cassette by one step along the track thereby advancing the previously advanced cassettes on the track by one step, a carrier disposed above said feed path, means for displacing said carrier between a raised position and a lowered position relative to said feed path, motive means drivingly connected to both said feed means and said carrier displacing means and operable to engage said feed means with the lowermost cassette for advancement when said carrier is in the raised position, an adhesive applying device mounted on said carrier to engage and apply adhesive to a first cassette on said track in the lowered position of the carrier, a label applying device mounted on said carrier and displaced from said adhesive applying device by one step in the direction of advance of the cassettes to apply in the lowered position of the carrier a label to the applied adhesive of a second cassette advanced by one step with respect to the first cassette, and a pressure applying device mounted on said carrier and displaced from said label applying device by one step in the direction of advance of the cassettes to apply in the lowered position of pressure to the label of a third cassette advanced by one step with respect to said second cassette.

Preferably, the apparatus includes a second adhesive applying device, a second label applying device and a second pressure applying device mounted on said carrier at intervals of one step and spaced from the first mentioned pressure applying device in the direction of advance of the cassettes, a cassette receiving and rotating device disposed in the path of advance of the cassettes along said track between the first mentioned pressure applying device and said second adhesive applying device and rotating means drivingly connected between said motive means and said cassette receiving and rotating device to rotate said cassette receiving device through 180° when said carrier is raised to correspondingly rotate the cassette received by said cassette receiving device and present that face opposed to the labelled face of the cassette to said second adhesive applying device.

This preferred form of embodiment makes it possible for each cassette to be furnished on both sides with a label when passing once only through the apparatus.

In an apparatus according to the invention the movement sequences are controlled by a single drive device which renders possible a hitherto unachievable synchorinization of these sequences and thus a hitherto unachievable accuracy in the positioning of the labels on the area of the cassette provided for that purpose. The relatively simple construction of the apparatus is not susceptible to faults and permits a high operating speed. Since in this new apparatus all the movement sequences are tuned to one another in advance and are not modified by the drive, the apparatus does not require any special adjustment devices and also specially trained personnel for operating the apparatus are not necessary.

An embodiment of the invention will now be described by way of example, reference being made to the accompanying drawings.

DETAILED DESCRIPTION OF INVENTION

Figure 1:
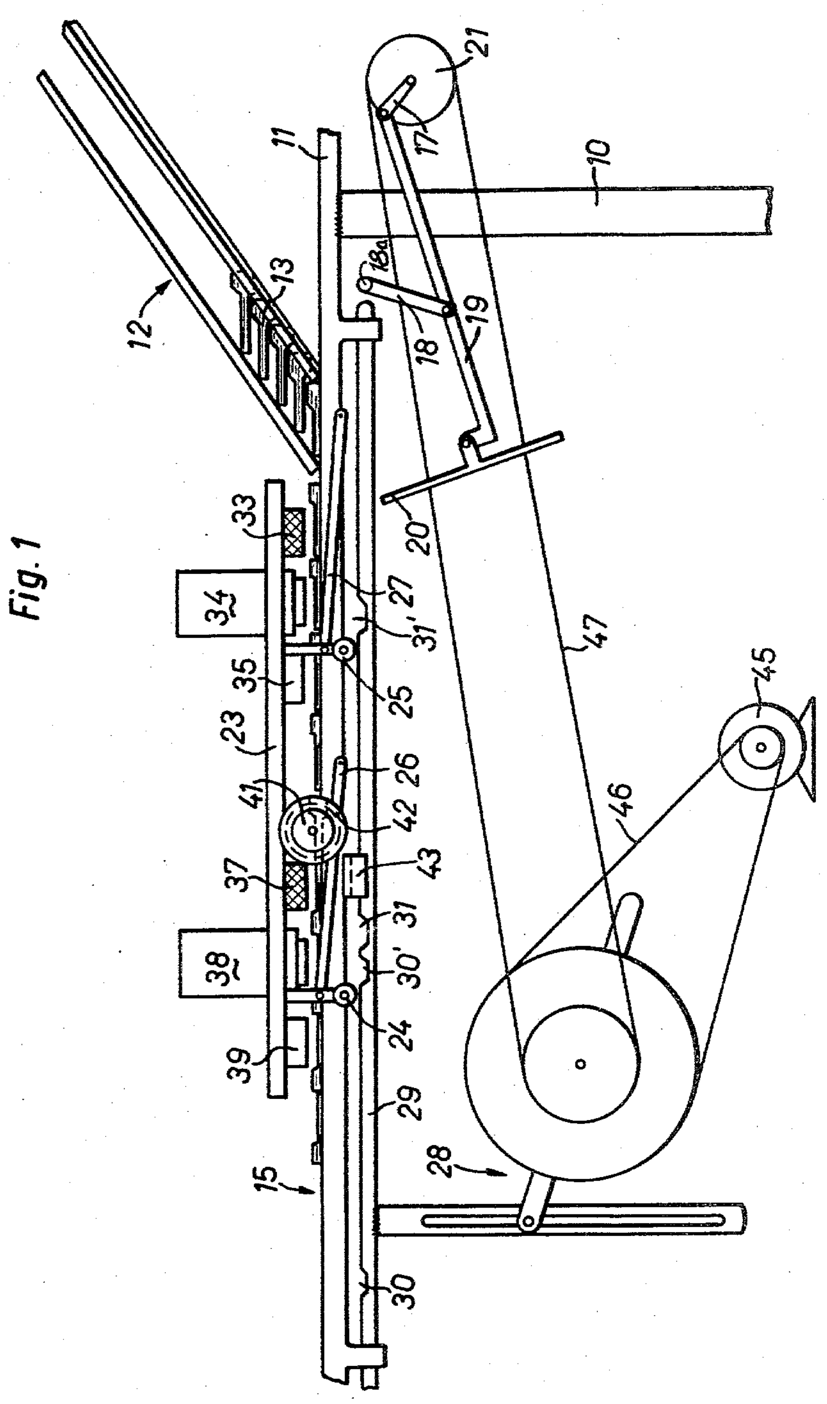
FIG. 1 is a diagrammatically illustrated, partially cut-away side view of a preferred embodiment of an apparatus according to the invention.
Figure 2:
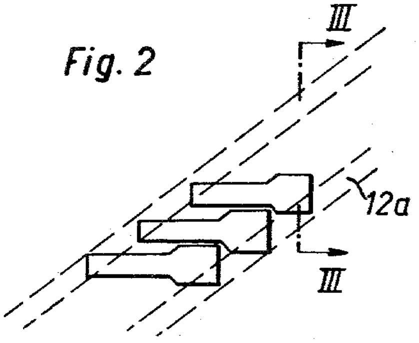
FIG. 2 is a diagrammatic side elevational view of the cassette magazine to a larger scale.
Figure 3:
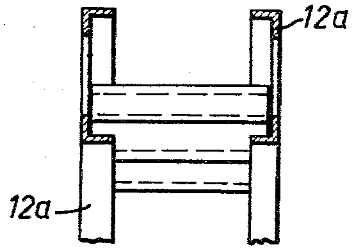
FIG. 3 is a section taken on the line III—III of FIG. 2, and, FIG. 4 is a perspective view of one of the label boxes seen from below.

The apparatus shown in FIG. 1 comprises a frame 10, on which all the devices forming part of the apparatus are mounted. To one side of a working plate 11, there is provided a magazine 12 for cassettes 13. The magazine is formed of 4 L-section rods 12*a* which are braced together in a manner not shown. The magazine is inclined to the horizontal and vertical. The tape cassettes are of conventional construction with two opposed larger faces and with a raised or thickened portion at which the tape when in use is normally engaged by a drive device and recording or play-back head. The cassettes are stacked in the magazine so that each has its region of lesser thickness supported on the region of greater thickness of the next lower cassette so that the stacked cassettes lie in the magazine substantially horizontally and parallel to one another without any additional guide means, although they are possessed of two regions of differing thicknesses. The lower end of the magazine 12 is in proximity to the inlet end of a guide track 15, which is provided by the surface of the working plate 11 bounded longitudinally by two spaced parallel rods. A linkage drive is carried on the frame 10 beneath the working plate 11 and magazine 12. This linkage drive comprises two rotatably journalled cranks 17, 18 and a connecting rod 19 and a feed plate 20 connected to the free end of the rod 19. The crank 17 is rigidly connected to a drive wheel 21, which is driven by a roller chain 47, to be described later. The crank 18 is pivotally connected between the arm 19 and a fixed pivot 18*a* on the frame 10. The working plate 11 is provided in the region of the bottom end of the magazine 12 and the inlet end to the guide track 15, with an aperture, extending longitudinally of the guide track, through which the upper part of the feed plate 20 can extend in order to engage and push the lowest cassette situated in the magazine out from the magazine onto the guide track 15.

A frame-shaped carrier 23 is disposed above the guide track and extends laterally beyond the guide track. The carrier 23 is supported on four wheels, of which only the wheels 24, 25 can be seen in FIG. 1, and is attached to the frame by means of two pivoted levers, of which again only the levers 26, 27 are shown, so as to be vertically pivotal and allow the carrier to be raised and lowered. Spaced parallel longitudinally extending slide rods 29 are reciprocally mounted on the frame 10 for reciprocation by a crank guide oscillator 28. The wheels 24, 25 of the carrier 23 support the carrier on the slide rods 29 which are each provided with two pairs of depressions 30, 31 and 30' and 31', the spacing between each depression of a pair corresponding to the spacing between the wheels 24 and 25. Thus, the carrier 23 is in a raised position when the wheels 24 and 25 run on the running surface of the slide rods 29 as seen in FIG. 1. When the slide rods 29 are driven to the right as seen in FIG. 1, the wheels 24 and 25 drop into the depressions 30 and 31 to lower the carrier 23. When the slide rods 29 are driven to the left as seen in FIG. 1, the wheels 24 and 25 drop into the depressions 30' and 31' to again lower the carrier 23.

The spacing between the depressions 30 and 30' and between the depressions 31 and 31' corresponds to the stroke of the slide rods 29.

Linkage drives and crank guide oscillators such as the linkage drive 17, 18, 19 and the crank guide oscillator 28 are mechanical devices familiar to the person skilled in the art and need not be further described. In this example, it should be noted that the linkage drive is arranged to perform two cycles of operation for each cycle of operation of the crank guide oscillator so that the feed plate 20 performs two work stroking strokes for each complete reciprocation of the slide rods 29. The feed plate 20 is driven to follow a closed path having an upper substantially horizontal working portion (from right to left as seen in FIG. 1), a descending portion, a lower return portion and a rising portion to complete the cycle. The time occupied by the feed plate 20 in following the upper horizontal working portion of its path is substantially equal to the remainder of its cycle time and length of this working portion is longer than the width of a cassette 23 so that the feed plate 20 has some clearance at the commencement of the working portion of its cycle before engaging the lowermost cassette 23 in the magazine and advancing it by one step along the guide track, thereby also advancing also the previously advanced cassettes on the guide track by a further step.

The linkage drive 17, 18, 19 and the crank guide oscillator 28 are driven in synchronism by a common motive means which is a motor 45 which drives the crank guide oscillator 28 by means of a V-belt 46 and the linkage drive 17, 18, 19 by the roller chain 47. This synchronous drive is arranged so that during the working stroke of the feed plate 20 during which cassettes are being advanced along the guide track 15, the slide rods 29 are being displaced in one or other of their two directions of reciprocation with the wheels 24 and 25 running on the surfaces of the slide rods 29 so that the carrier 23 is in its raised position and during at least a part of the remainder of the cycle time of the feed plate 20, the wheels 24 and 25 are engaged in the depressions 30 and 31 or 30' and 31' so that the carrier 23 is lowered on the levers 26 and 27 to its lowered position.

Considered in the direction of advance of the cassettes along the guide track 15, the carrier 23 has mounted thereon above the guide track, an adhesive applying device 33, such as a felt pad, a label applying box 34 and a pressure stamp 35, these being spaced at intervals corresponding to one step of advance of the cassettes although these intervals could correspond to multiple steps of advance. Spaced from the pressure stamp 35 by a multiple number of steps of advance considered in the direction of advance of the cassettes is a second adhesive applying device 37, followed at intervals of one step of advance (or multiple steps) by a second label applying box 38 and a second pressure stamp 39. Each of the adhesive applying devices is connected by a flexible pipe and pump (not shown) to a source of adhesive.

Rotatably mounted on the frame 10 between the pressure stamp 35 and the second adhesive applying device 37 is a turnover roll 41 located to be one step of advance or a multiple thereof from both the device 37 and the stamp 35. The roll 41 is rotatable about an axis which is normal to the direction of advance of the cassettes and which lies at the mean level of the cassettes on the guide track. The roll 41 has a diametral slot of a depth sufficient to receive a cassette, and arranged normally to be oriented with its medial plane common with the medial plane of the cassettes on the guide track 15, the mouth of the slot at each side being in the region of the cylindrical wall of the roll to facilitate the entry of a cassette into the slot. A toothed wheel 42 is attached to one end of the roll 41 and arranged to engage a toothed rack 43 mounted on the slide rod 29 at the corresponding side. The toothed rack 43 is of limited length and is such that for each stroke of the slide rod 29, the roll 41 is rotated through 180°. This is arranged to occur during displacement of the slide rods 29 during the non-working stroke of the feed plate 20, i.e., when the cassettes are stationary.

Figure 4:
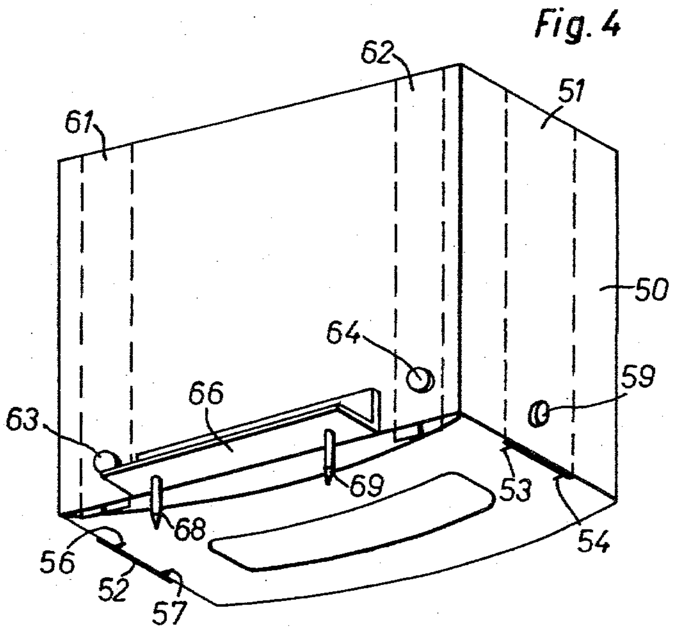

The label applying devices 34 and 38 each comprise a casing (FIG. 4) the internal cross-section of which is only slightly larger than the surface of the labels to be applied to the cassettes. The casing is of rectangular cross-section with two shorter and two longer sides. Along the internal face of each of the two shorter sides of the casing of which only the shorter side 50 can be seen in FIG. 4 there is a leaf spring 51,52. The lower end of the leaf spring projects slightly beyond the casing and possesses two practically horizontally oriented pins 53, 54 and 56, 57 respectively, extending over the lower open end. In the lower part of each narrow side an adjusting screw 59 is mounted, by which the spacing of the leaf springs 51 and 52 from the associated inner wall can be adjusted to position the pins accurately. Two leaf springs 61 and 62 are attached to the inner face of each longer wall of the casing, and adjusting screws 63, 64 are provided by means of which the position of these leaf springs can be adjusted. On that external face of the casing of the device 34 which is presented towards the magazine 12, a plate 66 is attached which supports two vertically downwardly extending locating pins 68, 69 which project below the open lower end rim of the casing. The diameter of and spacing between the locating pins 68, 69 correspond to the guide passages which are provided on every recording tape cassette for the purpose of correctly locating it in the recording and/or playing-back apparatus. As any skilled person will immediately recognize, in the second label box 38 which is lowered onto the upturned cassette, the corresponding plate and locating pins will be disposed on the external face of the casing remote from the magazine.

The label applying devices 34 and 38 are replaceably attached to the table-shaped carrier 23. In this way it is possible to fill and adjust the devices independently of the labelling operation and to convert the apparatus by simple and rapid replacement of the label devices for the application of different types of labels.

To describe the operation of the apparatus, let it be assumed that the magazine 12 is filled with cassettes 13 and the label applying devices 34, 38 are filled with labels. The motor 45 drives the crank guide oscillator 28 by the V-belt 46 and the linkage drive 17, 18, 19 by means of the roller chain 47. During travel of the feed plate 20 along the upper substantially horizontal working part of its cycle the feed plate pushes the lowest cassette in the magazine out from the magazine onto and along the guide track and at the same time displaces further all the cassettes located on the guide track by one cassette width. At the same time the slide rods 29 beneath the table-shaped carrier 23 are reciprocated by the crank guide oscillator 28. Each time the slide rods reach one of their two end limiting positions, the wheels 24, 25 of the carrier run into the depressions 30,31 or 30', 31' as the case may be, so that the carrier is lowered on the lever arms 26, 27. In this lowered position, the first and second devices 33, 37 touch the cassettes situated below them and transfer adhesive onto the regions provided for application of the label; the label boxes 34, 38 are located so closely above the cassettes beneath them that the lowest of the sagging labels touches the adhesive region of the previously advanced cassettes and are held by the adhesive, and the pressure stamps 35, 39 uniformly press the labels applied to still previously advanced cassettes on to the cassettes.

During the displacement of the slide rods 29 in the interval when the feed plate 20 has completed its working stroke and is completing its cycle, the rack 43 engages the toothed wheel 42 to rotate the roll 41 through 180°. The slot in the roll 41 effectively forms part of the feed path of the cassettes and as the cassettes are advanced stepwise along the feed path, a cassette is pushed into the slot and in turn pushes a cassette out of the slot. The cassette which is pushed out of the slot has been rotated through 180° so that the label applied thereto by the devices 33, 34 and 35 is now on the lower of the opposed larger faces of the cassettes and the other larger face is now uppermost ready to have a label applied thereto by the devices 37, 38 and 39.

As seen in FIG. 1, the feed plate 20 has completed its working stroke and is returning to complete its cycle and the cassettes are stationary. In the interval between the feed plate 20 completing its working and arriving at the position shown, the wheels 24 and 25 had dropped into the recesses 30' and 31' to lower the carrier 23 and the devices 33, 34 and 35 and 37, 38 and 39 were operative to apply adhesive, labels and pressure to the cassettes immediately thereunder. The slide rods have commenced to move to the right, raising the carrier 23 by moving the supporting wheels 24 and 25 out of the recesses 30' and 31' and the rack 43 is approaching the toothed wheel 42 to turn over a cassette in the slot of the roll 41. After this has been accomplished, the cycle of the working plate 20 is completed and it again commences its working stroke to advance the cassettes by one step along the guide track. At the end of this advance and during the time the feed plate is completing the non-working part of its cycle, the recesses 30 and 31 arrive beneath the wheels 24 and 25 to lower the carrier and adhesive, labels and pressure are applied by the devices 33, 34, 35 and 37, 38 and 39 to the cassettes immediately therebelow. The slide rods 29 are now moved to the left, raising the carrier 23 and the feed plate 20 commences another working stroke. Thus during each complete operation of the guide crank oscillator, there is an outward and return stroke of the slide rods 29, the feed plate 20 traverses the working part of its cycle twice and four labels are applied to cassettes.

It will be appreciated the apparatus described provides a simple and effective means for applying labels to both of the larger faces of a cassette in what is effectively a single pass through the machine. It will also be appreciated that the machine can have application for applying only a single label to a cassette in which case the devices 37, 38 and 39 would not be required nor would the turnover roll 41.

While the character of the invention has been described by way of example, this has been done by way of illustration only and without limitation of the invention. It will be apparent to those skilled in the art that modifications and variations of the described embodiment may be made in the practice of the invention within the scope of the following claims.

What is claimed is:

1. A labelling apparatus for tape cassettes comprising a magazine for the cassettes, a feed path for the cassettes, means for successively feeding the cassettes from said magazine to said feed path and for advancing said cassettes stepwise along said feed path, a carrier disposed above said feed path, an adhesive applying device mounted on said carrier, a label applying device mounted on said carrier, a pressure applying device mounted on said carrier, said adhesive applying device, label applying device and pressure applying device being mounted on said carrier in succession in the direction of advance of said cassettes along said feed path, carrier raising and lowering means associated with said cassette feeding means operable to hold said carrier in a raised position relative to said feed path during the advance of said cassettes and to lower said carrier towards said feed path when said cassettes are stationary on said feed path whereby in the lowered position of said carrier said adhesive applying device applies adhesive to a first cassette on the feed path, said label applying device applies a label to the applied adhesive on a second cassette on the feed path and said pressure applying device applies pressure to the applied label on a third cassette on the feed path.

2. A labelling apparatus according to claim 1 including a cassette receiving and rotating device disposed in said feed path after said pressure applying device considered in the direction of advance of said cassettes, a further adhesive applying device, a further label applying device and a further pressure applying device mounted on said carrier after said cassette receiving and rotating device considered in the direction of advance of said cassettes and rotating means drivingly connected to said cassette rotating device and drivenly connected to said carrier raising and lowering means and operable to rotate said cassette rotating device through 180° in the raised position of said carrier and between stepwise advances of said cassettes.

3. A labelling apparatus according to claim 1 in which the cassettes have thicker and thinner portions and the magazine extends upwardly and away from the feed path at an inclination to the horizontal and vertical and the cassettes are stacked therein with the thinner portion of each cassette supported on the thicker portion of the cassette next below so that the cassettes are supported substantially horizontally.

4. A labelling device according to claim 1 in which the cassette feeding means comprises a linkage drive incorporating a crank and a feed plate drivenly connected to the crank for displacement along a closed path comprising an upper substantially horizontal working portion in which it engages and displaces a cassette, and a lower return portion to complete the cycle, the working portion having a stroke greater than the width of one cassette.

5. A labelling apparatus according to claim 4 in which the time occupied by the working portion of the displacement of the feed plate is substantially equal to time occupied by the lower return portion thereof.

6. A labelling apparatus according to claim 1 in which the adhesive applying device comprises a felt pad connected through a pump to a source of adhesive.

7. A labelling apparatus according to claim 1 in which the label applying device comprises a substantially rectangular section casing having an open end from which labels are applied, and a vertically orientated leaf spring associated internally with each wall of the casing to hold the labels.

8. A labelling apparatus according to claim 1 in which the label applying device includes two spaced locating pins attached externally thereto operable to engage corresponding guide bores in a cassette in the lower position of said carrier.

9. A labelling apparatus according to claim 1 including a frame, spaced wheels supporting said carrier on said frame and pivotal levers connecting said carrier to said frame.

10. A labelling apparatus according to claim 9 in which said carrier raising and lowering means comprises slide rods formed with recesses at spacing corresponding to that of said wheels and means for reciprocating said slide rods whereby said wheels engage said recesses to lower said carrier and disengage from said recesses to raise said carrier.

11. A labelling apparatus according to claim 2 in which said carrier raising and lowering means comprises slide rods formed with spaced recesses, spaced wheels engageable simultaneously in said recesses and supporting said carrier, means for reciprocating said slide rods whereby said wheels engage said recesses to lower said carrier and disengage from said recesses to raise said carrier and wherein said rotating means comprises a toothed rack carried on one of said slide rods and a toothed wheel carried on said cassette rotating device and engageable with said toothed rack.

12. A labelling apparatus for tape cassettes having two opposed larger faces comprising a magazine for storing the cassettes in stacked relationship, a guide track for supporting cassettes on one of said larger faces thereof and defining a feed path for the cassettes and extending in proximity to the lowermost of the stacked cassettes in said magazine, feed means operable successively to feed the lowermost cassette in said stack to said feed path and to advance said cassettes at intervals along said feed path, a carrier disposed above said feed path, means for displacing said carrier between a raised position and a lowered position relative to said feed path, motive means operable to drive both said feed means and said carrier displacing means in synchronism to displace said carrier from said lowered position during the interval said feed means is operable to advance said cassettes and to displace said carrier to said lowered position during the interval between advances of said cassettes, an adhesive applying device mounted on said carrier to engage the other of said wider faces of a first cassette on said feed path in said lowered position, a label applying device mounted on said carrier to apply a label to the adhesive applied to a second cassette on said feed path in said lowered position, and a pressure applying device mounted on said carrier to apply pressure to the label applied to a third cassette on said feed path in said lowered position.

13. A labelling apparatus for applying labels to tape cassettes comprising a magazine for storing tape cassettes in stacked relationship, a guide track defining a feed path extending in proximity to the lowermost cassette in the stack, feed means operable at intervals successively to engage the lowermost cassette in the stack and advance the engaged cassette by one step along the track thereby advancing the previously advanced cassettes on the track by one step, a carrier disposed above said feed path, means for displacing said carrier between a raised position and a lowered position relative to said feed path, motive means drivingly connected to both said feed means and said carrier displacing means and operable to engage said feed means with the lowermost cassette for advancement when said carrier is in the raised position, an adhesive applying device mounted on said carrier to engage and apply adhesive to a first cassette on said track in the lowered position of the carrier, a label applying device mounted on said carrier and displaced from said adhesive applying device by one step in the direction of advance of the cassettes to apply in the lowered position of the carrier a label to the applied adhesive of a second cassette advanced by one step with respect to the first cassette, and a pressure applying device mounted on said carrier and displaced from said label applying device by one step in the direction of advance of the cassettes to apply in the lowered position of pressure to the label of a third cassette advanced by one step with respect to said second cassette.

14. Apparatus according to claim 13 in which the feed means comprises a crank device drivenly connected to said motive means and a feed plate carried on said crank for displacement along an upper substantially horizontal cassette engaging and advancing path and a lower return path.

15. Apparatus according to claim 14 in which the time of displacement of the feed plate along the upper substantially horizontal path is substantially equal to the balance of the cycle time of the displacement thereof.

16. Apparatus according to claim 13 in which the carrier displacing means comprises a crank guide oscillator drivenly connected to said motive means, slide rods driven for reciprocation by said crank guide means, depressions in said slide rods and wheels carried on said carrier and running on said slide rods and arranged simultaneously to drop in to said depressions to displace said carrier to the lowered position.

17. An apparatus according to claim 13 including a second adhesive applying device, a second label applying device and a second pressure applying device mounted on said carrier at intervals of one step and spaced from the first mentioned pressure applying device in the direction of advance of the cassettes, a cassette receiving and rotating device disposed in the path of advance of the cassettes along said track between the first mentioned pressure applying device and said second adhesive applying device and rotating means drivingly connected between said motive means and said cassette receiving and rotating device to rotate said cassette receiving device through 180° when said carrier is raised to correspondingly rotate the cassette received by said cassette receiving device and present that face opposed to the labelled face of the cassette to said second adhesive applying device.

18. An apparatus according to claim 17 in which said feed means comprises a crank drivenly connected to said motive means and a feed plate connected to said crank for displacement along a closed path having a substantially horizontal working portion in which the feed plate engages and advances a cassette; the carrier displacing means comprises a pair of reciprocable slide rods each having two pairs of spaced recesses, a separate pair of wheels supporting the carrier on each slide rod with the spacing between the wheels of a pair of wheels corresponding to the spacing between the recesses of a pair of recesses and means drivingly connecting the motive means to slide rods to reciprocate the slide rods; and wherein said motive means is arranged to drive said feed plate twice along said closed path for each complete reciprocation of said slide rods.

* * * * *